Feb. 1, 1949.   A. S. ALEXANDER   2,460,406
REAR VISION MIRROR FOR AUTOMOBILES
Filed Aug. 20, 1946

INVENTOR,
Arthur S. Alexander,
BY
Benjamin James,
Atty.

Patented Feb. 1, 1949

2,460,406

UNITED STATES PATENT OFFICE 2,460,406

REAR-VISION MIRROR FOR AUTOMOBILES

Arthur S. Alexander, New York, N. Y.

Application August 20, 1946, Serial No. 691,711

1 Claim. (Cl. 88—73)

This invention relates to a rear vision mirror for an automobile. Heretofore, such mirrors were made either circular or elongated horizontally, as rectangular or elliptical. Both of these forms have serious disadvantages, in that the circular mirror is required to be of overlarge area, in order to show suficient rear lateral images needed for reflection. While accomplishing the latter, however, as well as efficiently reflecting the remoter region of the highway, the overlarge area of the circular mirror reflects additionally unwanted objects, which seriously interfere with concentration upon the needed images and are productive of danger and insecurity. Furthermore, the said overlarge circular mirror tends strongly to often obstruct front vision, particularly when used as an outside mirror, thereby additionally producing danger and insecurity. To remedy such overlarge area of a circular mirror, the latter is often made convex, which reduces its size but causes the reflected objects to appear contracted, smaller, and unnatural, besides further bringing unwanted and disturbing images into vision, and this type of mirror being therefore disadvantageous. On the other hand, the use of a horizontally elongated mirror, while efficiently reflecting all required rear lateral images, however completely cuts out all reflections of the remoter region of the highway, and is therefore detrimental to safety.

In my efforts to remedy the disadvantages in prior rear vision mirrors, hereinabove referred to, I have found that the overall reflected image of any rear street, road, or highway consists of a perspective view entirely encompassable within an isosceles triangle, the base of which is near to the rear of the car and its apex extending therefrom upwardly, and that to render a mirror efficient it must be capable of encompassing the reflection of this particular triangular picture, besides embodying other advantages and being free from all of the aforesaid specific objections.

The principal object of my invention, therefore, is to provide an improved automobile rear vision mirror, which, while embodying the advantages and remedying the objections of both the circular and elongated mirrors, will fully encompass the aforesaid triangular view and eliminate the unwanted reflected views, and the said serious frontward obstructions thereby conducing to safety and more efficient driving.

Other objects and advantages will hereinafter appear.

In the accompanying drawings—

Figure 1:
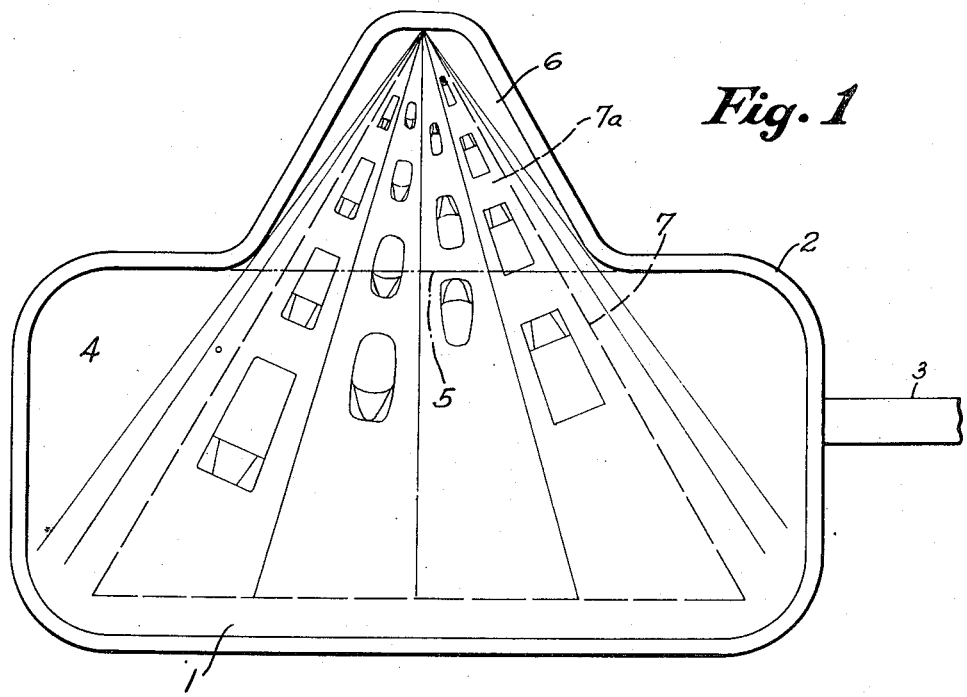
Fig. 1 is an elevational view of the rear vision mirror constituting the invention.
Figure 2:
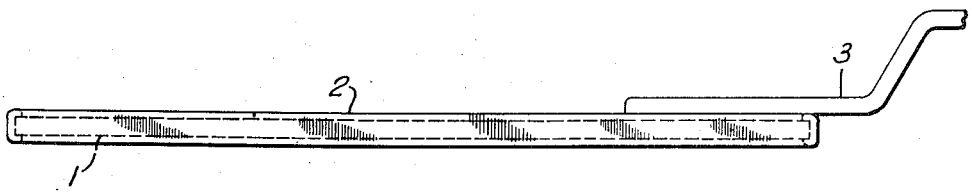
Fig. 2 is a top plan view of the mirror shown in Fig. 1.

The mirror 1 proper, mounted in a framing 2 carried by a bracket 3 secured to the car body, consists of a form providing an area 4 corresponding to that of the usual horizontally elongated rear vision mirror, but the upper median portion 5 thereof extends upwardly and also taperingly as shown, thereby creating a region 6 which together with the area 4 fully encompasses the above described triangular view 7 of the highway and including fully the reflection of the farther rear part 7a of the highway. It will be evident, therefore, that the mirror 1 will reflect all the rear views required for safe and efficient driving, eliminate all unwanted views, and occupy a minimum of extent, whereby the above recited and other objects and advantages of the invention are fully accomplished.

Variations may be resorted to within the scope of the invention.

Having thus described my invention, I claim:

An automobile rear view mirror having an oblong portion with upper and lower longitudinal edges and vertical lateral edges, and a centrally extending portion along the upper edge of the oblong portion, said extending portion tapering upwardly from the oblong portion, and the edges of the extending portion being offset inwardly from the said lateral edges, whereby a triangular perspective rear view is obtained and obstructions to forward vision are reduced.

ARTHUR S. ALEXANDER.

REFERENCES CITED

The following references are of record in the file of this patent:

UNITED STATES PATENTS

| Number | Name | Date |
| --- | --- | --- |
| D. 115,802 | Soderberg | July 18, 1939 |
| D. 145,459 | Putterman | Aug. 20, 1946 |
| 1,255,039 | Otte | Jan. 29, 1918 |
| 1,689,471 | Andrusis | Oct. 30, 1928 |
| 1,859,592 | Marchand | May 24, 1932 |
| 2,279,751 | Hensley | Apr. 14, 1942 |